US008451497B2

(12) United States Patent
Kosaka

(10) Patent No.: US 8,451,497 B2
(45) Date of Patent: May 28, 2013

(54) IMAGE PROCESSING DEVICE AND METHOD THEREFOR FOR AUTOMATICALLY DETERMINING READING MODE BASED ON IMAGE DATA READ BY IMAGE READER

(75) Inventor: Kiyoto Kosaka, Ishikawa (JP)

(73) Assignee: PFU Limited, Ishikawa (JP)

( * ) Notice: Subject to any disclaimer, the term of this patent is extended or adjusted under 35 U.S.C. 154(b) by 806 days.

(21) Appl. No.: 12/243,795

(22) Filed: Oct. 1, 2008

(65) Prior Publication Data

US 2009/0195802 A1 Aug. 6, 2009

(30) Foreign Application Priority Data

Feb. 6, 2008 (JP) .................................. 2008-026920

(51) Int. Cl.
*G06K 9/00* (2006.01)
*G06K 1/00* (2006.01)
*H04N 1/40* (2006.01)

(52) U.S. Cl.
USPC .............................. 358/2.1; 358/1.9; 382/169

(58) Field of Classification Search
None
See application file for complete search history.

(56) References Cited

U.S. PATENT DOCUMENTS

| 6,556,711 | B2 * | 4/2003 | Koga et al. ..................... 382/173 |
| 6,791,710 | B1 * | 9/2004 | Bannai ........................... 358/1.2 |
| 2001/0053248 | A1 * | 12/2001 | Maeda ........................... 382/165 |
| 2006/0221415 | A1 * | 10/2006 | Kawamoto ..................... 358/518 |
| 2007/0127094 | A1 * | 6/2007 | Kawamoto ..................... 358/518 |

FOREIGN PATENT DOCUMENTS

| JP | 5130406 | | 5/1993 |
| JP | 8186706 | | 7/1996 |
| JP | 08-242366 | A | 9/1996 |
| JP | 8336040 | | 12/1996 |
| JP | 11-191832 | A | 7/1999 |
| JP | 2001016452 | | 1/2001 |
| JP | 2001238076 | | 8/2001 |
| JP | 2002010097 | | 1/2002 |
| JP | 2002-057822 | A | 2/2002 |
| JP | 2003161247 | * | 6/2003 |
| JP | 2006246017 | | 9/2006 |
| JP | 2009261927 | | 9/2006 |
| JP | 2006279096 | | 10/2006 |
| JP | 2007-081687 | A | 3/2007 |

OTHER PUBLICATIONS

Japanese Decision of a Patent Grant for Application No. JP2008-026920 mailed Feb. 28, 2012.

* cited by examiner

*Primary Examiner* — Barbara Reinier
(74) *Attorney, Agent, or Firm* — Lowe Hauptman Ham & Berner, LLP

(57) ABSTRACT

An image processor comprising a control unit, wherein the control unit includes a determining unit that determines a reading mode suitable for a document based on image data corresponding to the document read by an reader; and a converting unit that converts the image data according to the reading mode. The determining unit includes a color detecting unit that detects color information based on the image data; a color determining unit that determines whether the reading mode is a color mode based on the color information; a background detecting unit that detects a background of the document; a background removing unit that removes the background; a gray detecting unit that detects a size of an area of a portion which is not removed in the image data as gray information; and a gray determining unit that determines whether the reading mode is a gray mode based on the gray information.

5 Claims, 6 Drawing Sheets

IMAGE PROCESSING DEVICE AND METHOD THEREFOR FOR AUTOMATICALLY DETERMINING READING MODE BASED ON IMAGE DATA READ BY IMAGE READER

RELATED APPLICATIONS

The present application is based on, and claims priority from, Japan Application Number 2008-026920, filed Feb. 6, 2008, the disclosure of which is hereby incorporated by reference herein in its entirety.

BACKGROUND OF THE INVENTION

1. Field of the Invention

The present invention relates to an image processor, an image processing method, and an image processing program.

2. Description of the Related Art

Conventionally, when a monochrome document is read in binary, especially, a picture portion and a shaded portion in the document are not reproduced. When the monochrome document is read in color, color components which are not present in the document are output due to scanner characteristics, and a file size becomes large.

Then, a user obtains an image in which the picture portion and the shaded portion are reproduced, without color components, and having a small file size, by switching a reading mode to gray setting to read the monochrome document.

JP-A-11-191832 discloses a technique to perform a main scan after distinguishing an image type (color, gray or binary) by a pre-scan. JP-A-2007-81687 discloses a technique to determine contents (color, gray or binary, and resolution) of a document image by the pre-scan and set a reading condition of front and back sides. JP-A-8-242366 discloses a technique to detect a document attribution (color, gray or binary and resolution) and switch the reading mode based on the detected document attribution. JP-A-2002-57822 discloses a technique to change the reading mode when a reading size is larger than a free space of a disk and inform the user of the same.

However, there is a problem that a reading speed is reduced, because it is required to read the document twice in the pre-scan and the main scan in JP-A-11-191832, it is required to read the document in the pre-scan in JP-A-2007-81687, and it is required to return the document and read again depending on the detection result in JP-A-8-242366. In JP-A-2007-81687, it is possible to configure the read setting of the front and back sides in the scanner capable of continuously feeding paper; however, there is a problem that the read setting of a first piece of paper may not be changed or that the read setting of the first piece of paper and a second piece of paper may not be different. In JP-A-8-242366, a histogram is used when determining multiple values or binary by a document attribution; however, there is a problem that when using the histogram, the character or the like also seems gray in determination with low resolution, so that it is difficult to determine with high accuracy.

SUMMARY OF THE INVENTION

It is an object of the present invention to at least partially solve the problems in the conventional technology.

An image processor according to one aspect of the present invention, includes a control unit. The control unit includes a determining unit that determines a reading mode suitable for a document, based on image data corresponding to the document read by an reader, and a converting unit that converts the image data according to the reading mode determined by the determining unit. The determining unit further includes a color detecting unit that detects color information regarding a color of the document, based on the image data, a color determining unit that determines whether the reading mode suitable for the document is a color mode, based on the color information detected by the color detecting unit, a background detecting unit that detects a background and any one of a line segment and a character or both of the document, based on the image data, a background removing unit that removes the background and any one of the line segment and the character or both detected by the background detecting unit, from the image data, a gray detecting unit that detects a size of an area of a portion which is not removed in the image data as gray information regarding gray of the document, based on the image data obtained after the background and any one of the line segment and the character or both are removed by the background removing unit, and a gray determining unit that determines whether the reading mode suitable for the document is a gray mode, based on the gray information detected by the gray detecting unit.

An image processing method according to another aspect of the present invention is executed by an information processing apparatus including a control unit. The method includes a determining step of determining a reading mode suitable for a document, based on image data corresponding to the document read by an reader, and a converting step of converting the image data according to the reading mode determined at the determining step. The determining step further includes a color detecting step of detecting color information regarding a color of the document, based on the image data, a color determining step of determining whether the reading mode suitable for the document is a color mode, based on the color information detected at the color detecting step, a background detecting step of detecting a background and any one of a line segment and a character or both of the document, based on the image data, a background removing step of removing the background and any one of the line segment and the character or both detected at the background detecting step, from the image data, a gray detecting step of detecting a size of an area of a portion which is not removed in the image data as gray information regarding gray of the document, based on the image data obtained after the background and any one of the line segment and the character or both are removed at the background removing step, and a gray determining step of determining whether the reading mode suitable for the document is a gray mode, based on the gray information detected at the gray detecting step.

A computer program product according to still another aspect of the present invention includes a computer readable medium including programmed instructions for executing an image processing method. The instructions, when executed by a computer, cause the computer to perform a determining step of determining a reading mode suitable for a document, based on image data corresponding to the document read by an reader, and a converting step of converting the image data according to the reading mode determined at the determining step. The instructions cause the computer to further perform, at the determining step, a color detecting step of detecting color information regarding a color of the document, based on the image data, a color determining step of determining whether the reading mode suitable for the document is a color mode, based on the color information detected at the color detecting step, a background detecting step of detecting a background and any one of a line segment and a character or both of the document, based on the image data, a background removing step of removing the background and any one of the line segment and the character or both detected at the background detecting step, from the image data, a gray detecting step of detecting a size of an area of a portion which is not removed in the image data as gray information regarding gray of the document, based on the image data obtained after the background and any one of the line segment and the character or both are removed at the background removing step, and a gray determining step of determining whether the reading mode suitable for the document is a gray mode, based on the gray information detected at the gray detecting step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the image processor, the image processing method, and the computer program product according to the present invention are described below in detail with reference to the accompanying drawings. It is noted that the present invention is not limited by these embodiments.

1 Overview of the Present Invention

First, an overview of the present invention is explained with reference to FIGS. 1A-C.

Figure 1A:
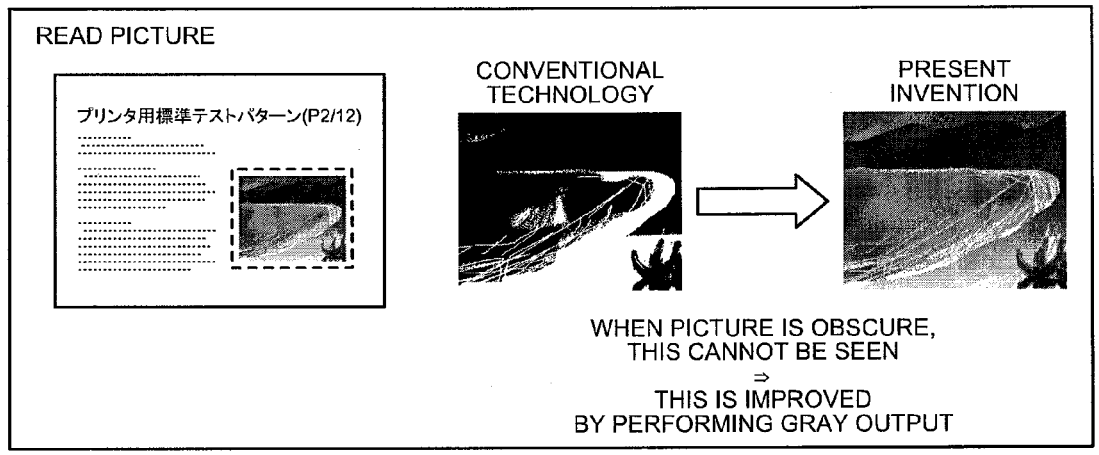
FIG. 1A is a schematic diagram showing an overview of the present invention with respect to a read picture.
Figure 1B:
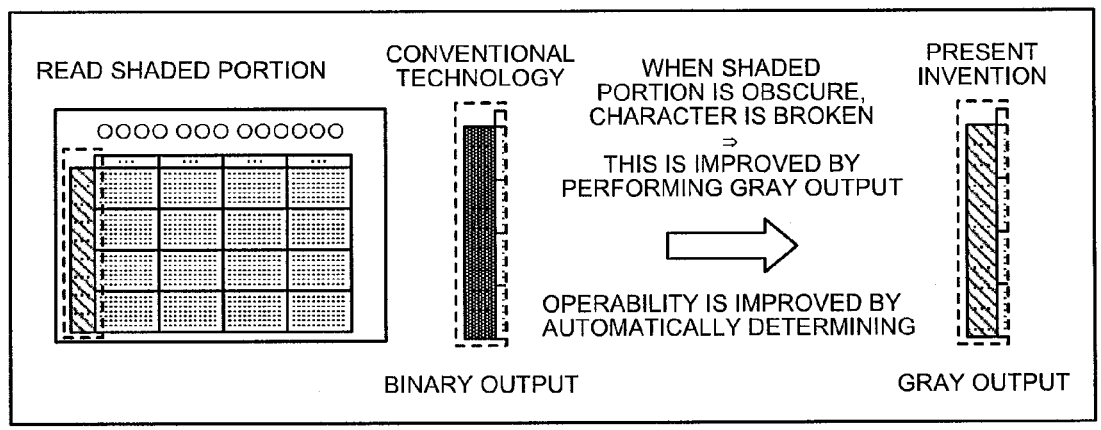
FIG. 1B is a schematic diagram showing an overview of the present invention with respect to a read shaded portion.
Figure 1C:
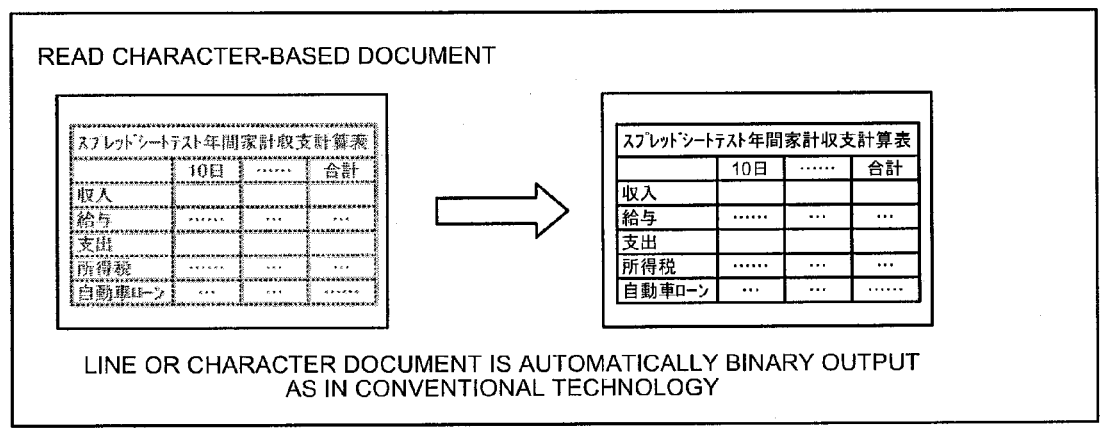
FIG. 1C is a schematic diagram showing an overview of the present invention with respect to a read character-based document.

Conventionally, when a monochrome document is read in binary, it is not possible to reproduce, especially, a picture (refer to FIG. 1A) and a shaded portion (refer to FIG. 1B) in the document, as shown in FIGS. 1A-B. Specifically, when the picture is obscure, this cannot be seen, and when the shaded portion is obscure, the character is broken. On the other hand, when the monochrome document is read in color, color components which are not present in the document are output due to scanner characteristics, and a file size becomes large. To solve the problem, a user obtains an image in which the picture and the shaded portion are reproduced, without color components, and having a small file size, by switching to a gray setting to read the monochrome document, as shown in FIGS. 1A-B. However, in this method, the user has to switch to the gray setting.

Therefore, in the present invention, a reading mode (color mode/gray mode/binary mode) is automatically determined by performing two stages of color detection process and gray detection process. Thereby, in addition to simplifying an operation by the user (i.e. improving operability), it is not required to perform a pre-scan or the like, the reading mode may be changed for each read page, high-quality and high-speed reading is realized also by the scanner capable of continuously reading, and further, reduction of the file size may be realized. In the present invention, especially in a gray detection process, a method to see a gradation as in the conventional technology is not adopted, but an area other than a line segment such as a character and a table is extracted by extracting and removing a background and a line component from image data, and it is determined whether to be the gray mode or the binary mode based on a size of the extracted area. Thereby, it becomes possible to determine the gray mode with high accuracy even with low resolution. When reading the character-based document, the line and the character are automatically output in binary as in the conventional technology (refer to FIG. 1C).

In the present invention, when there is a portion other than the document in the read image, a process to remove the portion other than the document from the image in advance may be performed, or the portion other than the document may be determined when determining the reading mode. Specifically, there is an A4-size scanner capable of reading an A3-size document by folding the same, and when synthesizing the A3-size document by such scanner, a seam is generated, so that in the present invention, when synthesizing the A3-size document, it is possible to remove the seam from a target of gray determination and performs gray determination with the image obtained by removing the seam. Thereby, the gray determination with high accuracy becomes possible.

In the present invention, when an upper limit value of the file size set in advance by the user is smaller than the file size of the file after being saved, the file size may be reduced by automatically executing a compression process to convert to the file of a required file size. In the present invention, when the file size is larger than the upper limit value even when the compression processing is executed, it is possible to execute a dividing process to change to the files having the file size easy to be sent by e-mail or the like.

2. Configuration of the Embodiment

First, the whole configuration of the image processor 100 according to the embodiment is explained with reference to FIG. 2.

Figure 2:
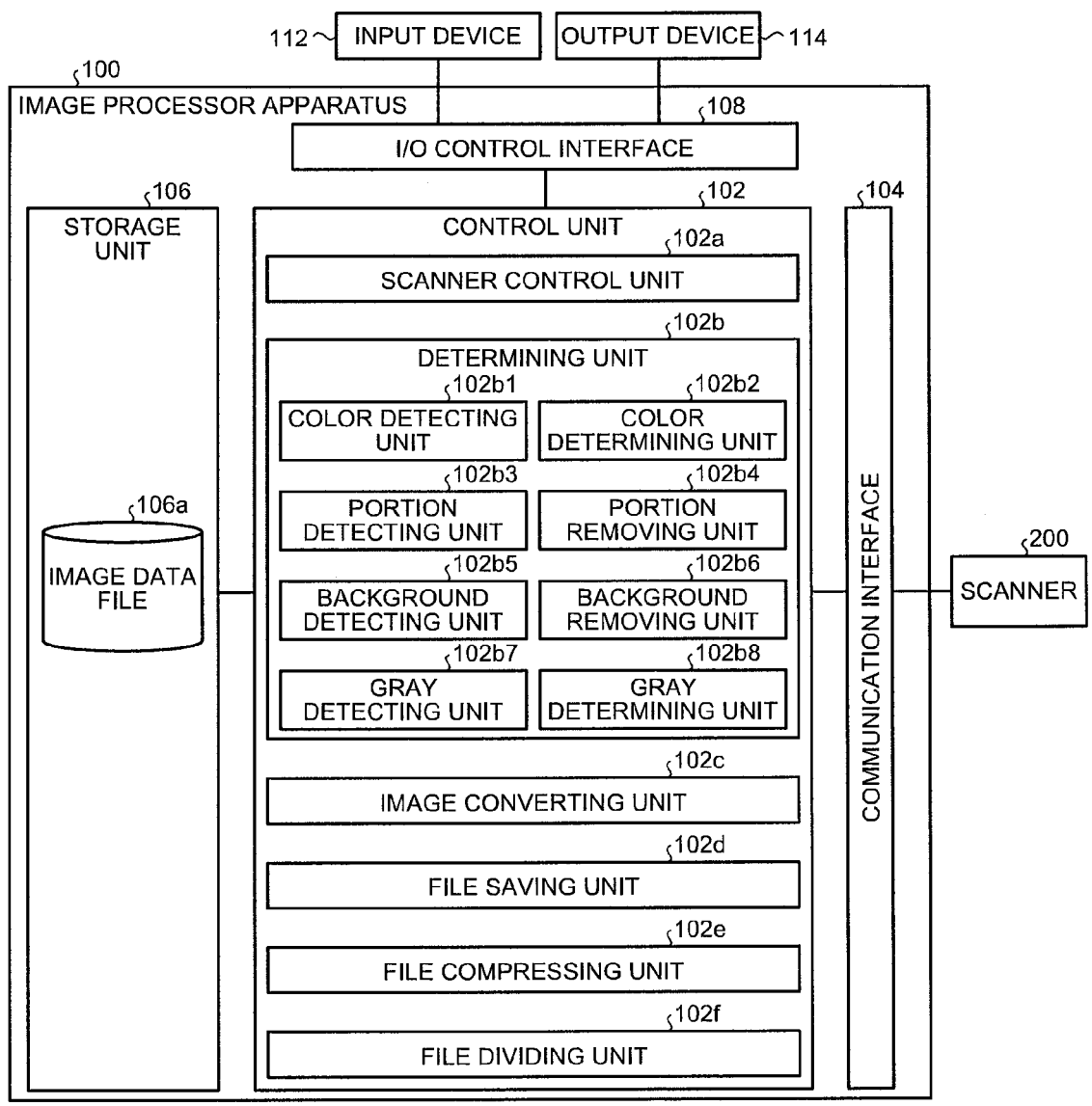
FIG. 2 is a block diagram of one example of a whole configuration of an image processor 100.
Figure 3:
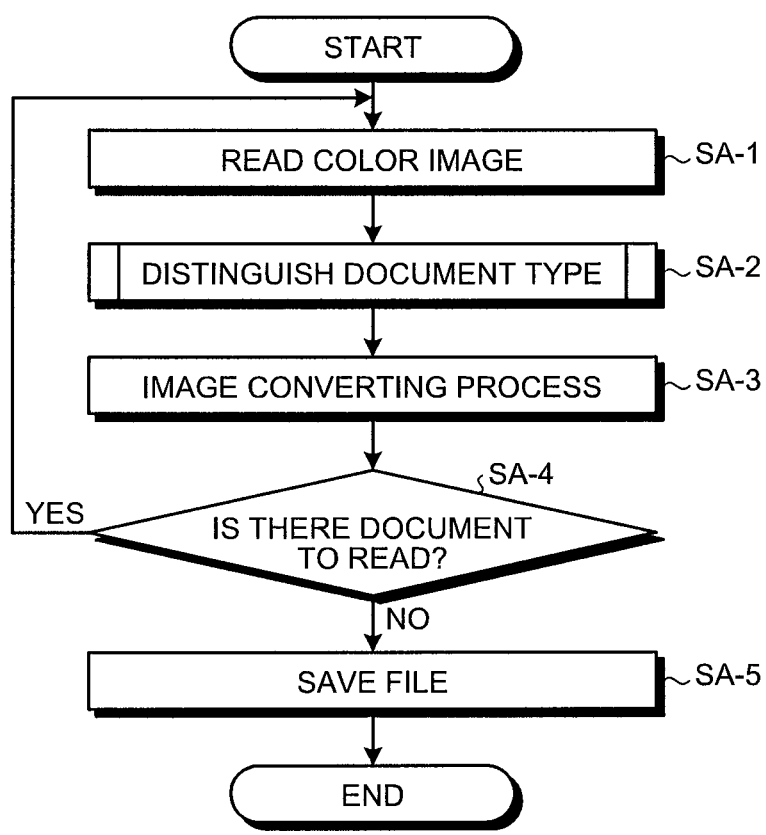
FIG. 3 is a flowchart showing one example of main process.

As shown in FIG. 2, the image processor 100 is communicably connected to a scanner 200. The image processor 100 is provided with a control unit 102, a communication interface 104, a storage unit 106, and an input/output (I/O) control interface 108, all of which are communicably connected to each other through an optional communication channel.

The communication interface 104 is communicably connected from the image processor 100 to the scanner 200 or other terminals via a communication device such as a router, and a wired or wireless communication line such as a dedicated line. The communication interface 104 has a function of communicating data with the scanner 200 or other terminals via the communication line. The communication interface 104 mediates communication between the image processor 100 and the scanner 200 or other terminals.

The storage unit 106 stores various databases, tables, and files. The storage unit 106 is a storage means including memory devices such as a random access memory (RAM) or a read only memory (ROM), and fixed disk storage like a hard disk (HD), a flexible disk, and an optical disc. The storage unit 106 stores therein computer programs to give instructions to the central processing unit (CPU) in cooperation with an OS (Operating System) and to cause the computer to perform various processes. The computer programs are loaded into the RAM and executed, to form the controller in cooperation with the CPU, As shown in FIG. 2, the storage unit 106 stores an image data file 106a. The image data file 106a stores image data converted by an image converting unit 102c as described in below.

The input/output (I/O) control interface 108 is connected to the input device 112 and an output device 114. A monitor (including a television for home use), a speaker, a printer or the like may be used as the output device 114 (the output device 114 is sometimes described as the monitor 114 in below). A keyboard, a mouse device, a microphone, or a monitor that realizes a pointing device function in cooperation with the mouse device may be used as the input device 112.

The control unit 102 is composed of CPU or the like that integrally controls the image processor 100. The control unit 102 includes an internal memory that stores a control program such as an Operating System (OS), a program that defines various procedures, required data or the like. The control unit 102 performs information processing by these programs to execute various processes. As shown in FIG. 2, the control unit 102 is provided with a scanner control unit 102a, a determining unit 102b, the image converting unit 102c, a file saving unit 102d, a file compressing unit 102e, and a file dividing unit 102f.

The scanner control unit 102a allows the scanner 200 in which a predetermined reading condition is set to read the document, and obtains the image data generated by the scanner 200 as a result of reading from the scanner 200.

The determining unit 102b determines the reading mode (color/gray/binary) suitable for the document, based on the image data obtained by the scanner control unit 102a (image data corresponding to the document read by the scanner 200). The determining unit 102b is mainly provided with a color detecting unit 102b1, a color determining unit 102b2, a portion detecting unit 102b3, a portion removing unit 102b4, a background detecting unit 102b5, a background removing unit 102b6, a gray detecting unit 102b7, and a gray determining unit 102b8, as shown.

The color detecting unit 102b1 detects color information (specifically, such as a color component and a size thereof) regarding the color of the document, based on the image data. The color determining unit 102b2 determines whether the reading mode suitable for the document is the color mode, based on the color information detected by the color detecting unit 102b1.

The portion detecting unit 102b3 detects the portion other than the document (specifically, such as the seam, a tear, and a fold of document), based on the image data. The portion removing unit 102b4 may remove the portion other than the document detected by the portion detecting unit 102b3 from the image data, or may inform the background detecting unit 102b5 of this as a non-detection area portion.

The background detecting unit 102b5 detects the background and any one of the line segment and the character or both of the document, based on the image data. The background removing unit 102b6 removes the background and any one of the line segment and the character or both detected by the background detecting unit 102b5 from the image data.

The gray detecting unit 102b7 detects a size of the area of the portion, which is not removed, in the image data as gray information regarding the gray of the document, based on the image data obtained after the background and any one of the line segment and the character or both are removed by the background removing unit 102b6. The gray detecting unit 102b7 may detect the gray information based on the image data obtained after the background and any one of the line segment and the character or both are removed by the background removing unit 102b6 and the portion other than the document is removed by the portion removing unit 102b4.

The gray determining unit 102b8 determines which of the gray mode and the binary mode, the reading mode suitable for the document is, based on the gray information detected by the gray detecting unit 102b7.

The image converting unit 102c converts the image data according to the reading mode determined by the determining unit 102b. The file saving unit 102d saves (stores) the image data after being converted by the image converting unit 102c in a predetermined storage area of an image data file 106a as the file, or saves (stores) the file after being compressed by the file compressing unit 102e and the file after being divided by the file dividing unit 102f. When the size of one or a plurality of files saved in the image data file 106a is larger than a predetermined capacity, the file compressing unit 102e compresses the file by a predetermined compressing method. When the size of the file after being compressed by the file compressing unit 102e is larger than the predetermined capacity, the file dividing unit 102f divides the file per page or per file.

3. Process of the Embodiment

Then, one example of each processing performed by the image processor 100 is explained with reference to FIGS. 3 to 7.

First, one example of main process performed by the control unit 102 is explained with reference to FIGS. 3 to 6.

The scanner control unit 102a activates the scanner 200 in which the predetermined reading mode is set to read, and obtains the image data generated by the scanner 200 as a result of reading from the scanner 200 (step SA-1). To obtain the image suitable for each of a plurality of applications, the reading mode is set to the mode of a large information amount (such as a high-resolution mode and a color mode) in advance.

The determining unit 102b determines the reading mode (color/gray/binary) suitable for the document, based on the image data (the image data corresponding to the document read by the scanner 200) obtained at the step SA-1 (step SA-2: document type distinguishing process).

Figure 4:
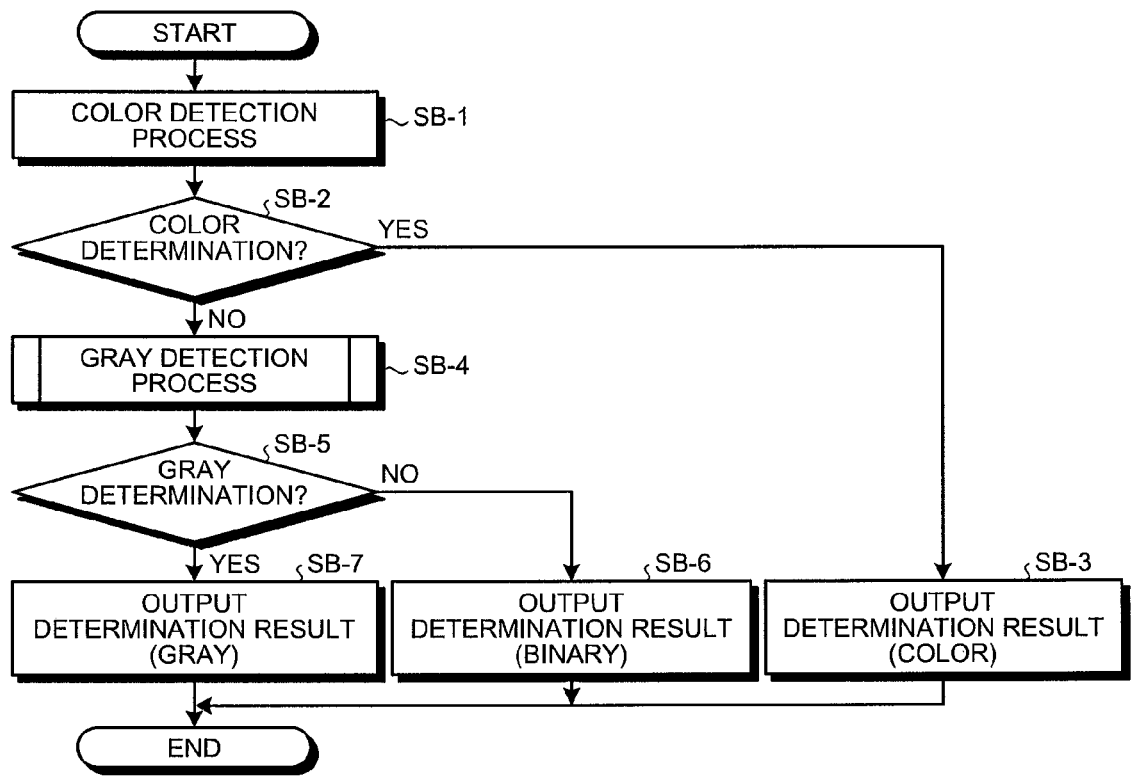
FIG. 4 is a flowchart showing one example of document type distinguishing process.

Here, one example of document type distinguishing process performed by the determining unit 102b is explained with reference to FIG. 4.

The color detecting unit 102b1 detects color information (specifically, such as a color component and a size thereof) regarding the color of the document, based on the obtained image data (step SB-1).

The color determining unit 102b2 determines whether the reading mode suitable for the document is the color mode (specifically, determines whether the size of the color component is equal to or larger than the predetermined threshold), based on the color information detected at the step SB-1, and, when the determination result is "color mode", the color determining unit 102b2 outputs the determination result to the determining unit 102b.

On the other hand, when the determination result by the color determining unit 102b2 is not the "color mode" (step SB-2: No), the gray detecting unit 102b7 or the like detects the gray information regarding gray of the document, by executing a gray detection process to be explained later, based on the obtained image data (step SB-4).

Figure 5:
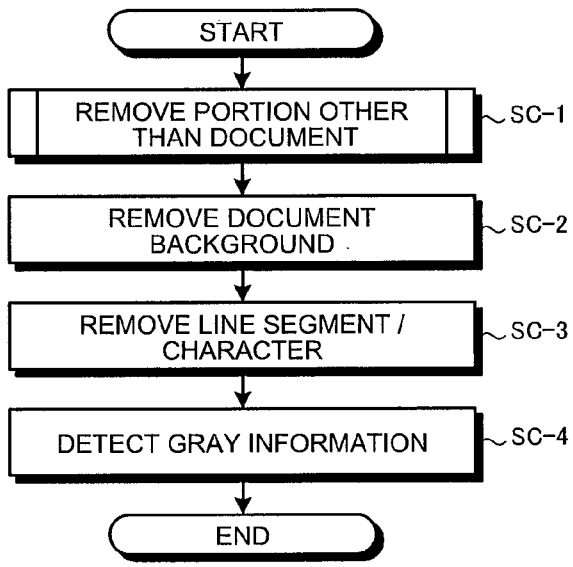
FIG. 5 is a flowchart showing one example of gray detection process.

One example of the gray detection process performed by the gray detecting unit 102b7 or the like is explained with reference to FIG. 5.

The portion detecting unit 102b3 detects the portion other than the document based on the obtained image data, and the portion removing unit 102b4 removes the detected portion from the image data (step SC-1: portion detecting and removing process).

Figure 6:
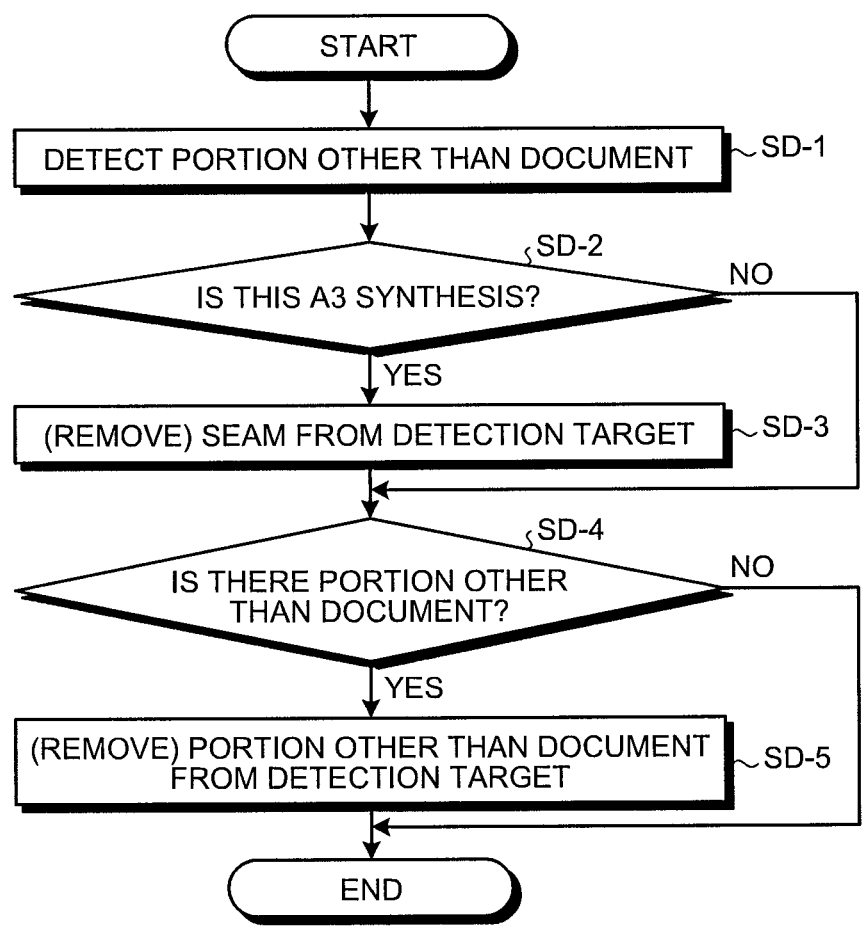
FIG. 6 is a flowchart showing one example of portion detecting and removing process.

One example of the portion detecting and removing process performed by the portion detecting unit 102b3 or the like is explained with reference to FIG. 6.

The portion detecting unit 102b3 detects the portion other than the document (specifically, whether there is the seam of the document due to A3 synthesis) based on the obtained image data (step SD-1).

When the portion detecting unit 102b3 detects that there is the seam of the document due to A3 synthesis (specifically, when detecting the gray component from a synthesized portion (10 mm in a center portion)) at the step SD-1 (step SD-2: Yes), the portion removing unit 102b4 removes the seam from the image data, thereby removing the seam from the target of the gray determination (step SD-3).

When the portion detecting unit 102b3 detects that there is a portion such as the tear or the fold of the document based on the obtained image data (specifically, when an area larger than the document is read, and an edge of the document or the gray component is detected from the edge of the document) (step SD-4: Yes), the portion removing unit 102b4 removes the portion from the image data, thereby removing the portion from the target of the gray determination (step SD-5).

Hereby, the explanation of the portion detecting and removing process performed by the portion detecting unit 102b3 or the like ends. When there is the portion other than the document in the image data, this portion is possibly judged to be gray; however, by executing this process, this possibility may be cleared. When the image data is formed only of the document portion, it is not required to execute this process.

Referring again to FIG. 5, the background detecting unit 102b5 detects the background of the document based on the image data obtained after the portion other than the document is removed at the step SC-1, and the background removing unit 102b6 removes the detected background from the image data (step SC-2). Specifically, a slice with which the background and other areas are separable is obtained from the histogram of the image of the document portion.

The background detecting unit 102b5 detects the line segment and the character of the document based on the image data obtained after the portion other than the document and the background are removed at the step SC-2 (for example, by setting the portion other than the document and the background to white and setting other portions to black, when continuity of black dots is equal to or less than 2 mm, detects the same as the line segment), and the background removing unit 102b6 removes the detected line segment and the character from the image data (step SC-3).

The gray detecting unit 102b7 detects the size of the area of the portion, which is not removed, in the image data as the gray information regarding the gray of the document, based on the image data obtained after the portion other than the document, the background, the line segment, and the character are removed at the step SC-3 (step SC-4).

Hereby, the explanation of the gray detection process performed by the gray detecting unit 102b7 or the like ends. Although gray is detected by determining whether to be gray based on a tone component in the document in the conventional technology, in this embodiment, to further improve accuracy, gray is detected by determining whether to be gray based on the size of the portion obtained by removing the background, the line segment, and the character in the document.

Referring again to FIG. 4, the gray determining unit 102b8 determines which of the gray mode and the binary mode, the reading mode suitable for the document is, based on the gray information (specifically, the size of the area of the portion, which is not removed, in the image data after the portion other than the document, the background, the line segment, and the character are removed, and is calculated by using a labeling method (when a plurality of areas are detected, the size of the largest one)) detected at the step SB-4 (specifically, determines which of the gray mode and the binary mode, based on whether the size of the area is equal to or larger than a predetermined slice (for example, 10 mm)), and when the determination result is the "binary mode" (step SB-5: No), outputs the determination result to the determining unit 102b (step SB-6), on the other hand, when the determination result is the "gray mode" (step SB-5: Yes), outputs the determination result to the determining unit 102b (step SB-7).

Hereby, the explanation of the document type distinguishing process performed by the determining unit 102b ends. In this embodiment, determination is performed in two steps in the order of the color detection and the gray detection.

Referring again to FIG. 3, the image converting unit 102c converts the image data obtained at the step SA-1 according to the determination result (reading mode of any of color/gray/binary) at the step SA-2 (step SA-3). By performing the image converting process after distinguishing the document type, it is possible to read the document without performing the reading twice including the pre-scan or the like.

When there is the document to be read (step SA-4: Yes), the control unit 102 repeats the steps SA-1 to SA-3 until the document to be read is run out, and when the document to be read is run out (step SA-4: No), the file saving unit 102d saves (stores) the image data converted at the step SA-3 in the predetermined storage area in the image data file 106a as the file (step SA-5). Thereby, it is possible to read the document by changing the reading mode regardless the page or front and back sides of the document to be read.

Hereby, the explanation of the main process performed by the control unit 102 ends.

Figure 7:
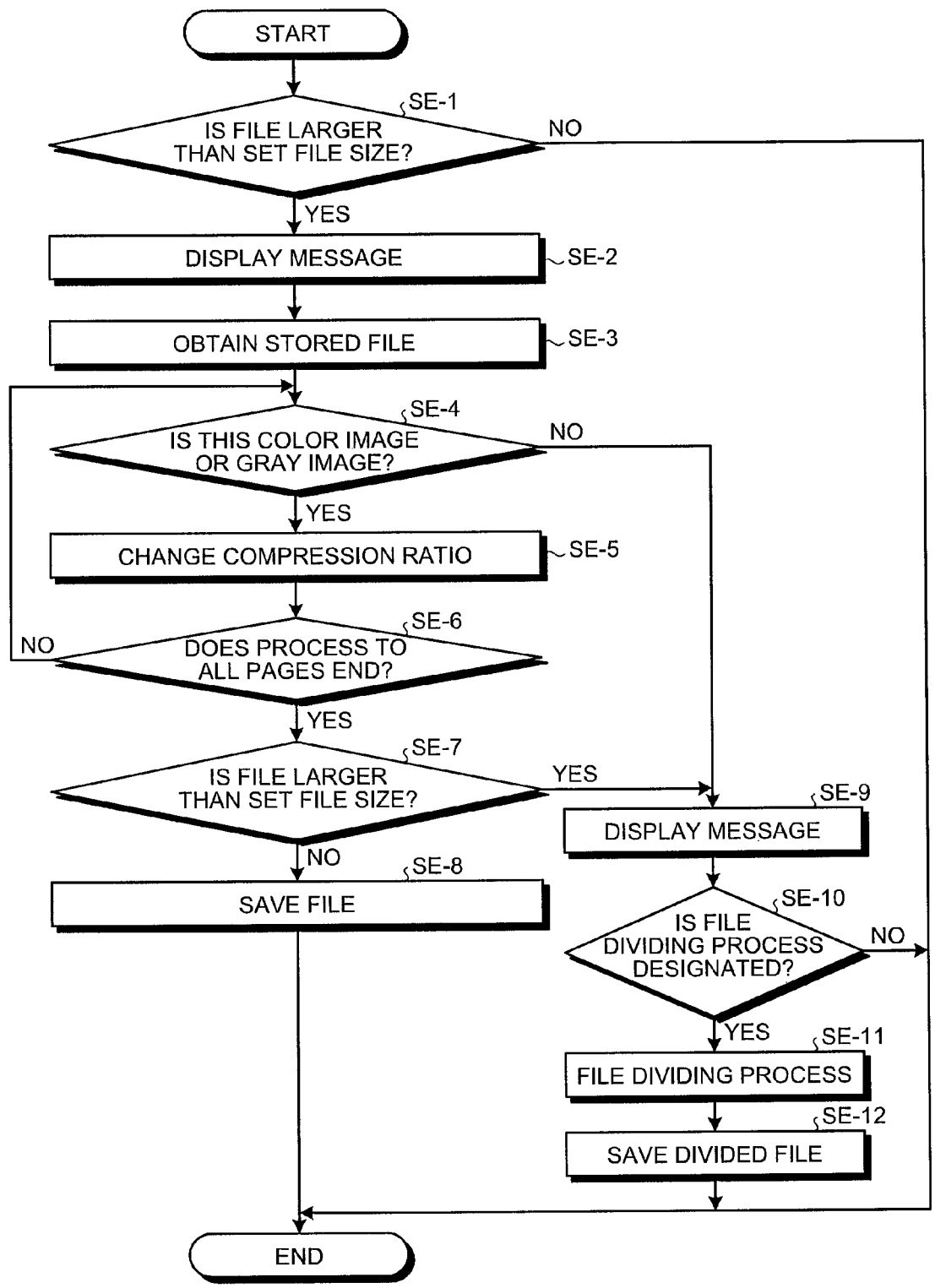
FIG. 7 is a flowchart showing one example of file compressing and dividing process.

One example of file compressing and dividing process performed by the control unit 102 is explained with reference to FIG. 7.

The file compressing unit 102e determines whether the size of one or a plurality of files stored in the image data file 106a by the above-explained main process is larger than the capacity (file size) set by the user in advance, and when the determination result is "large" (step SE-1: Yes), displays a predetermined message on the output device 114 (step SE-2).

The file compressing unit 102e obtains the file, which is judged to be larger than the set capacity at the step SE-1, from the image data file 106a (step SE-3).

The file compressing unit 102e determines whether the file obtained at the step SE-3 is the color image or the gray image, and when the determination result is the "color image or the gray image" (step SE-4: Yes), changes a compression ratio of the file by a predetermined compression method (step SE-5). The file compressing method may be the method of changing a compression parameter such as JPEG, or a so-called high-compression method of separating the character and the picture and performing compression suitable for them, or the method of reducing the resolution of the image.

On the other hand, when the determination result is not the "color image or gray image" (step SE-4: No), the file compressing unit 102e informs the file dividing unit 102f of the same, and the file dividing unit 102f displays a predetermined message on the output device 114 in response to the information (step SE-9).

The file compressing unit 102e repeats the steps SE-4 and SE-5 until the process to all pages in the file ends (step SE-6: No).

After the process to all pages in the file ends (step SE-6: Yes), the file compressing unit 102e determines again whether the size of the file compressed at the step SE-5 is larger than the file size set by the user in advance, and when the determination result is not "large" (step SE-7: No), the file saving unit 102d saves (stores) the file in the predetermined area of the image data file 106a (step SE-8).

On the other hand, when the determination result is "large" (step SE-7: Yes), the file compressing unit 102e informs the file dividing unit 102f of the same, and the file dividing unit 102f displays the predetermined message on the output device 114 in response to the information (step SE-9).

The file dividing unit 102f divides the file compressed at the step SE-5 by the pages or by the files to change the size thereof (step SE-11), when designated by the user to divide the file (step SE-10: Yes).

The file dividing unit 102f or the file saving unit 102d saves (stores) a plurality of the files (the divided files) after being divided at the step SE-11, in the predetermined storage area in the image data file 106a (step SE-12).

Hereby, the explanation of the file compressing and dividing process performed by the control unit 102 ends. In this manner, after saving the file, when the file size is larger than the upper limit of the value set by the user in advance, it is possible to change to the file having the capacity for the user to use easily, by compressing the image file. This file compressing and dividing process is executed for all the documents.

4. Summary of the Embodiment and Other Embodiments

As described in detail, the image processor 100 determines a reading mode based on image data read by the scanner 200, converts the image data according to the reading mode determined. The image processor 100 repeats these determining and converting processes until the document to be read is run out. Specifically, when determining the reading mode, the image processor 100 detects color information based on the image data, and determines whether the reading mode is a color mode based on the color information detected. When the reading mode is not determined as the color mode, the image processor 100 detects a portion other than the document (a seam, a tear, a fold, or the like), a background, a line segment, and a character of the document, based on the image data, and removes those detected. Then, the image processor 100 detects a size of an area of a portion which is not removed in the image data, based on the image data obtained after removing, and determines whether the reading is a gray mode or a binary mode based on the size detected.

Thereby, it is possible to automatically determine the reading mode (color mode, gray mode, and binary mode) with high accuracy even with low resolution without bothering the user, and as a result, there is an effect that the high-quality and high-speed reading may be performed by the scanner capable of continuously reading and the reading mode may be changed with respect to each page to be read without performing the pre-scan or the like. For example, in an A4-size scanner capable of reading an A3-size document by folding the same, a seam generated when synthesizing the A3-size document and also a tear and a fold may be removed from the image data, so that there is an effect that gray determination can be performed with high accuracy.

When a size of the image file after being converted is larger than the predetermined capacity, the image processor compresses the file by a predetermined compression method, and divides the file per page or per file when the size of the file after being compressed is larger than the predetermined capacity. Thereby, there is an effect of converting to a file having a capacity for the user to use easily.

Although the embodiment of the present invention is explained so far, the present invention may be implemented in different embodiments without departing from scope of the technological ideas described in claims of the present invention. For example, all the automatic processes explained in the present embodiment can be, entirely or partially, carried out manually. Similarly, all the manual processes explained in the present embodiment can be, entirely or partially, carried out automatically by a known method. The process procedures, the control procedures, specific names, various information, display example, and database construction, mentioned in the description and drawings can be changed as required unless otherwise specified.

The distribution and integration of the device are not limited to those illustrated in the figures. The device as a whole or in parts can be functionally or physically distributed or integrated in an arbitrary unit according to various attachments or how the device is to be used.

The constituent elements shown in the figures are merely conceptual and may not necessarily physically resemble the structures shown in the drawings. For example, the process functions performed by each device of the image processor 100 can be entirely or partially realized by a central processing unit (CPU) and a computer program executed by the CPU or by a hardware using wired logic. The computer program, recorded on a recording medium to be described later, can be mechanically read by the image processor 100 as the situation demands.

The storage device such as ROM or HD included in the image processor 100 stores the computer program that can work in coordination with the operating system (OS) to issue commands to the CPU and cause the CPU to perform various processes. The computer program is first loaded to the RAM, and realizes functions of the devices included in the image processor 100 in collaboration with the CPU. The computer program can be stored in any application program server connected to the image processor 100 via the network, and can be fully or partially loaded as the situation demands. The computer-readable recording medium may store the computer program. The computer-readable recording medium on which the computer program can be stored may be a portable type such as flexible disk, ROM, erasable programmable ROM (EPROM), electrically erasable programmable ROM (EEPROM), compact disk-read-only memory (CD-ROM), magneto optic (MO) disk, digital versatile disk (DVD), or a communication medium that stores the computer program for a short term such as communication channels or carrier waves that transmit the computer program over networks such as local area network (LAN), wide area network (WAN), and the Internet. Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The compression method may be a method of changing a compression parameter such as JPEG, a so-called high-compression method of separating the character and a picture by a layout recognition or the like and compressing with the compression method suitable for each separated portion (refer to the patent documents below), and a method of lowering the resolution of the image. However, when the image suitable for each portion (area) is output by the high-compression method, it is possible that there is incongruity at the seam of the portion, that it is easily wrongly detected with low resolution, and that certain length of processing time is required to separate the character and the picture. JP-A-2004-242075, JP-A-2004-229261, Japanese Patent No. 3108133, JP-A-5-145768, and JP-A-6-178122 disclose a technique to separate the character area as binary and the picture area as multiple values and compress the image. JP-B-7-22343, Japanese Patent No. 3068361 and Japanese Patent No. 3193086 disclose a technique to change the compression ratios of the character area and the picture area and compress the image. Japanese Patent No. 3275807 and Japanese Patent No. 3384299 disclose a technique to separate the image into three planes to compress.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor comprising a control unit, wherein the control unit includes:
   a determining unit that determines a reading mode suitable for a document, based on image data corresponding to the document read by a reader once; and
   a converting unit that converts the image data according to the reading mode determined by the determining unit without performing the reading twice, and
   the determining unit includes:
      a color detecting unit that detects color information regarding a color of the document, based on the image data;
      a color determining unit that determines whether the reading mode suitable for the document is a color mode, based on the color information detected by the color detecting unit;
      a background detecting unit that detects a background and any one or both of a line segment and a character of the document, based on the image data;
      a background removing unit that removes the background and any one or both of the line segment and the character detected by the background detecting unit, from the image data;
      a size detecting unit that detects a size of an area of a portion, which is not removed in the image data, as size information, based on the image data obtained after the background and any one or both of the line segment and the character have been removed by the background removing unit; and
      a gray determining unit that determines whether the reading mode suitable for the document is a gray mode, based on the size information detected by the size detecting unit.

2. The image processor according to claim 1, wherein the determining unit further includes:
   a portion detecting unit that detects a portion other than the document, based on the image data; and
   a portion removing unit that removes the portion detected by the portion detecting unit from the image data, and
   the size detecting unit detects the size information, based on the image data obtained after the background and any one or both of the line segment and the character have been removed by the background removing unit and the portion has been removed by the portion removing unit.

3. The image processor according to claim 1, further comprising a storage unit, wherein
   the control unit further includes:
      a file saving unit that saves the image data after being converted by the converting unit in the storage unit as a file;
      a compressing unit that compresses the file by a predetermined compression method when a size of one or a plurality of the files saved in the storage unit by the file saving unit is larger than a predetermined capacity; and
      a dividing unit that divides the file when the size of the file after being compressed by the compressing unit is larger than the predetermined capacity.

4. An image processing method executed by an information processing apparatus comprising a control unit, wherein the method includes:
   a determining step of determining a reading mode suitable for a document, based on image data corresponding to the document read by a reader once; and
   a converting step of converting the image data according to the reading mode determined at the determining step and without performing the reading twice, and
   the determining step includes:
      a color detecting step of detecting color information regarding a color of the document, based on the image data;
      a color determining step of determining whether the reading mode suitable for the document is a color mode, based on the color information detected at the color detecting step;
      a background detecting step of detecting a background and any one or both of a line segment and a character of the document, based on the image data;
      a background removing step of removing the background and any one or both of the line segment and the character detected at the background detecting step, from the image data;
      a size detecting step of detecting a size of an area of a portion, which is not removed in the image data, as size information, based on the image data obtained after the background and any one or both of the line segment and the character have been removed at the background removing step; and
      a gray determining step of determining whether the reading mode suitable for the document is a gray mode, based on the size information detected at the size detecting step.

5. A non-transitory computer program product having a computer readable medium including programmed instructions which, when executed by a computer, cause the computer to perform an image processing method comprising:
   a determining step of determining a reading mode suitable for a document, based on image data corresponding to the document read by a reader once; and
   a converting step of converting the image data according to the reading mode determined at the determining step and without performing the reading twice, wherein the determining step includes:
- a color detecting step of detecting color information regarding a color of the document, based on the image data;
- a color determining step of determining whether the reading mode suitable for the document is a color mode, based on the color information detected at the color detecting step;
- a background detecting step of detecting a background and any one or both of a line segment and a character of the document, based on the image data;
- a background removing step of removing the background and any one or both of the line segment and the character detected at the background detecting step, from the image data;
- a size detecting step of detecting a size of an area of a portion, which is not removed in the image data, as size information, based on the image data obtained after the background and any one or both of the line segment and the character have been removed at the background removing step; and
- a gray determining step of determining whether the reading mode suitable for the document is a gray mode, based on the size information detected at the size detecting step.

\* \* \* \* \*